United States Patent
Marinero et al.

(10) Patent No.: US 7,722,967 B2
(45) Date of Patent: May 25, 2010

(54) RECORDING MEDIUM COMPRISING LAMINATED UNDERLAYER STRUCTURES

(75) Inventors: Ernesto E. Marinero, Saratoga, CA (US); Brian R. York, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1327 days.

(21) Appl. No.: 11/192,387

(22) Filed: Jul. 27, 2005

(65) Prior Publication Data

US 2007/0026261 A1 Feb. 1, 2007

(51) Int. Cl.
*G11B 5/66* (2006.01)
(52) U.S. Cl. ................................................. 428/831.2
(58) Field of Classification Search ........................ None
See application file for complete search history.

(56) References Cited

U.S. PATENT DOCUMENTS

| | | | | |
|---|---|---|---|---|
| 4,722,869 | A | 2/1988 | Honda et al. | 428/611 |
| 5,723,198 | A | 3/1998 | Hosoe et al. | 428/141 |
| 6,280,813 | B1 * | 8/2001 | Carey et al. | 428/828 |
| 6,641,935 | B1 | 11/2003 | Li et al. | 428/694 TS |
| 6,670,056 | B2 | 12/2003 | Hikosaka | 428/694 TS |
| 6,759,149 | B1 * | 7/2004 | Chen et al. | 428/828 |
| 6,777,113 | B2 | 8/2004 | Trindade et al. | 428/694 TM |
| 6,815,082 | B2 * | 11/2004 | Girt | 428/828.1 |
| 6,818,330 | B2 | 11/2004 | Shukh et al. | 428/694 TM |
| 6,821,652 | B1 * | 11/2004 | Okamoto et al. | 428/828.1 |
| 6,828,047 | B2 * | 12/2004 | Abarra et al. | 428/832.1 |
| 7,279,240 | B2 * | 10/2007 | Nolan | 428/828 |
| 7,368,185 | B2 * | 5/2008 | Hirayama et al. | 428/831.2 |
| 2003/0108776 | A1 | 6/2003 | Chang et al. | 428/694 TM |
| 2003/0170500 | A1 | 9/2003 | Shimizu et al. | 428/694 TM |
| 2004/0038083 | A1 | 2/2004 | Hirayama et al. | 428/694 TM |
| 2004/0072031 | A1 | 4/2004 | Oh et al. | 428/694 BS |
| 2004/0191571 | A1 | 9/2004 | Hirayama et al. | 428/694 T |
| 2004/0247945 | A1 | 12/2004 | Chen et al. | 428/694 TS |
| 2005/0058855 | A1 * | 3/2005 | Girt | 428/694 TS |

FOREIGN PATENT DOCUMENTS

| | | |
|---|---|---|
| JP | 2002288820 | 10/2002 |
| JP | 204220737 | 8/2004 |
| JP | 2004296030 | 10/2004 |

OTHER PUBLICATIONS

T. Oikawa, M. Nakamura, H. Uwazumi, T. Shimatsu, H. Muraoka and Y. Nakamura, "Microstructure and Magnetic Properties of CoPtCr-SiO$_2$ Perpendicular Recording Media," Sep. 2002, IEEE Transactions on Magnetics, vol. 38, No. 5.

E.M.T. Velu, Sudhir Malhotra, Gerardo Bertero, and David Wachenschwanz, "Low-Noise CoCrPtO Perpendicular Media With Improved Resolution," Mar. 2003, IEEE Transactions on Magnetics, vol. 39, No. 2.

* cited by examiner

*Primary Examiner*—Holly Rickman
(74) *Attorney, Agent, or Firm*—Zilka-Kotab, PC (57) ABSTRACT

A perpendicular recording medium having an underlayer structure that improves the microstructural properties of the recording layer. A spacer layer is intercalated between the lower and upper hcp metal layers. This results in improvements in microstructure of the upper hcp metal layer and the recording magnetic layer, which in turn results in gains in recording media performance. Further, the thickness of the upper hcp metal layer can be reduced, thereby reducing the distance between the recording layer and the soft underlayer, providing further gains in recording media performance.

26 Claims, 7 Drawing Sheets

| Disk | Ru (bot) | Spacer | Ru (top) | EBL (t) | HC | BER | Jitter1 | TAA |
|---|---|---|---|---|---|---|---|---|
|  | Nm | 1 nm | Nm | Nm | Oe |  |  |  |
| C17 | 5 |  | 12 | 17 | 6022 | -4.20 | 3.20 | 0.96 |
| C19 | 5 |  | 4.8 | 9.8 | 5151 | -4.00 | 3.27 | 0.97 |
| C22 | 5 | Ta2O5 | 4.8 | 10.8 | 5442 | -4.35 | 3.20 | 1.00 |

RECORDING MEDIUM COMPRISING LAMINATED UNDERLAYER STRUCTURES

FIELD OF THE INVENTION

The present invention relates to recording media, and more particularly, this invention relates to a new structure for magnetic recording media.

BACKGROUND OF THE INVENTION

In a typical head, an inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Figure 1:
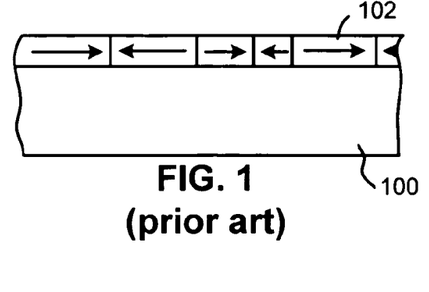
FIG. 1 is a schematic representation in section of a recording medium utilizing a longitudinal recording format.

FIG. 1 illustrates, schematically, a conventional recording medium such as used with conventional magnetic disc recording systems. This medium is utilized for recording magnetic impulses in or parallel to the plane of the medium itself. The recording medium, a recording disc in this instance, comprises basically a supporting substrate 100 of a suitable non-magnetic material such as glass, with an overlying coating 102 of a suitable and conventional magnetic layer.

Figures 2, 4, 5:
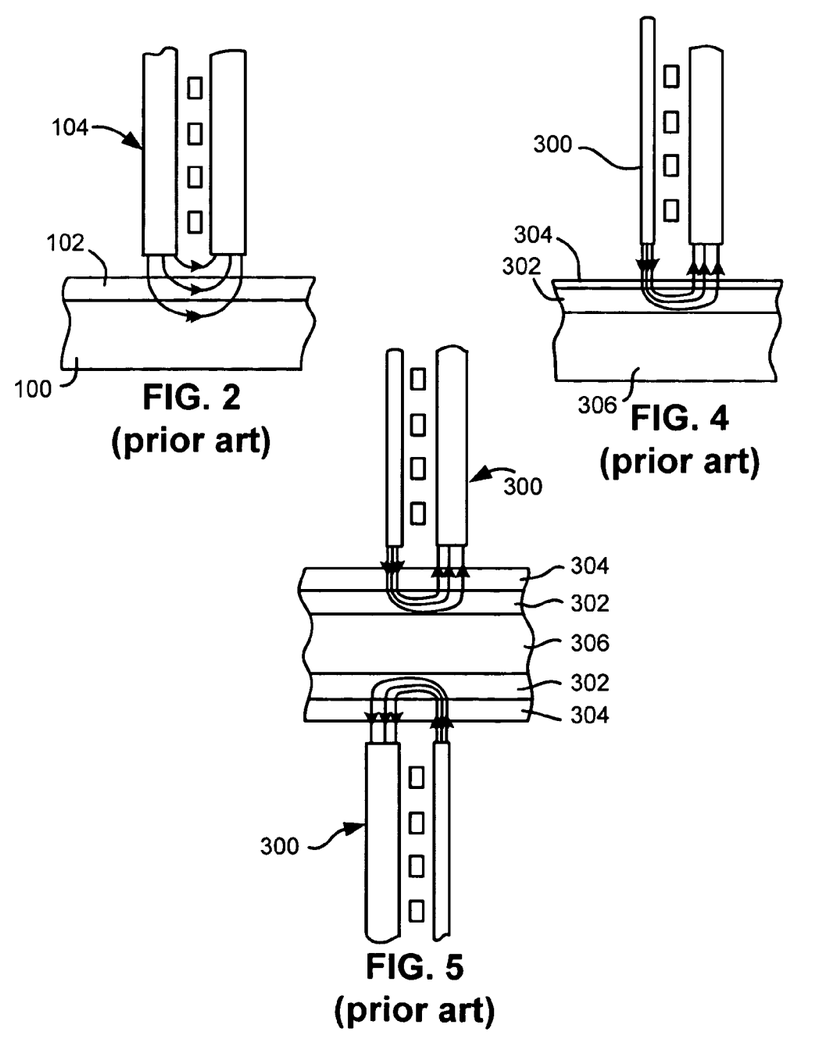
FIG. 2 is a schematic representation of a conventional magnetic recording head and recording medium combination for longitudinal recording as in FIG. 1.
FIG. 4 is a schematic representation of a recording head and recording medium combination for perpendicular recording on one side.
FIG. 5 is a schematic representation of the recording apparatus of the present invention, similar to that of FIG. 4, but adapted for recording separately on both sides of the medium.

FIG. 2 shows the operative relationship between a conventional recording/playback head 104, which may preferably be a thin film head, and a conventional recording medium, such as that of FIG. 1.

Figure 3:
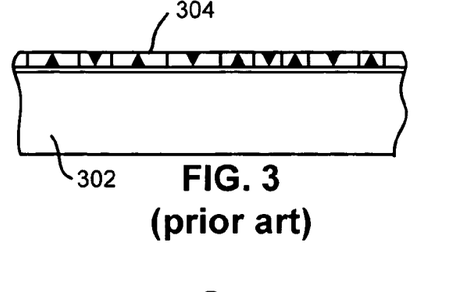
FIG. 3 is a magnetic recording medium utilizing a perpendicular recording format.

FIG. 3 illustrates schematically the orientation of magnetic impulses substantially perpendicular to the surface of the recording medium. For such perpendicular recording the medium includes an under layer 302 of a material having a high magnetic permeability. This under layer 302 is then provided with an overlying coating 304 of magnetic material preferably having a high coercivity relative to the under layer 302, such as a Co-containing material.

Two embodiments of storage systems with perpendicular heads 300 are illustrated in FIGS. 4 and 5 (not drawn to scale). The recording medium illustrated in FIG. 4 includes both the high permeability under layer 302 and the overlying coating 304 of magnetic material described with respect to FIG. 3 above. However, both of these layers 302' and 304 are shown applied to a suitable substrate 306.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 302 back to the return layer (P1) of the head 300.

FIG. 5 illustrates a similar structure in which the substrate 306 carries the layers 302 and 304 on each of its two opposed sides, with suitable recording heads 300 positioned adjacent the outer surface of the magnetic coating 304 on each side of the medium.

Fabrication of current-art perpendicular recording media (PMR) employs a Ru hcp-underlayer (where "hcp" refers to hexagonal closed packed) to control the c-axis orientation of a typically Co-based alloy magnetic recording layer. The hcp-underlayer structural characteristics play a key role in determining the crystalline order (texture), the grain size, and the defect density of the Co-based recording alloy. Furthermore, said underlayers also influence the formation of the desired granular structure comprising small Co-alloy grains segregated by a non-magnetic phase. Current underlayers for perpendicular recording do not meet all of the desired requirements for developing an optimum microstructure of the Co-based recording alloys.

Figure 6:
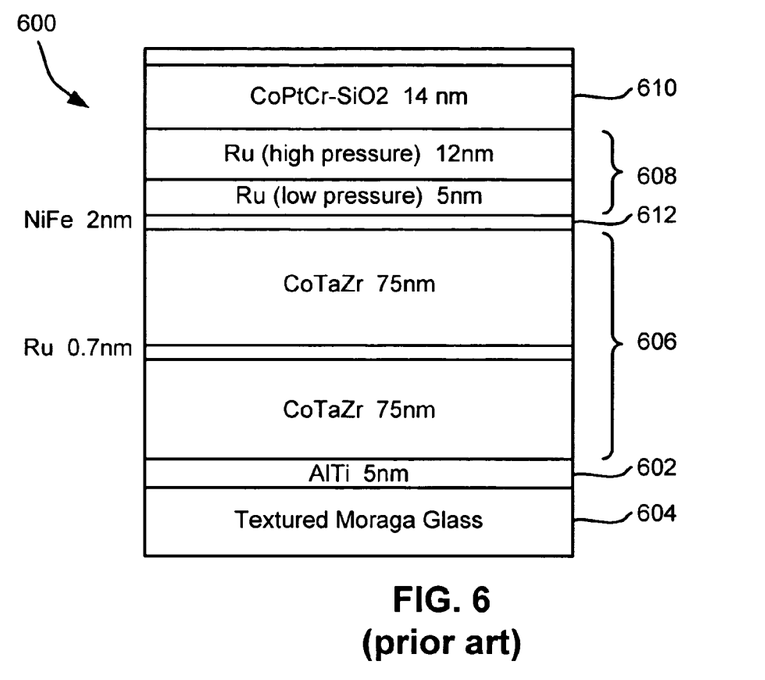
FIG. 6 is a simplified partial cross sectional view of a prior art perpendicular recording medium.

FIG. 6 shows a current-art perpendicular media architecture 600. An adhesion layer 602 of an alloy of AlTi is deposited on a glass substrate 604. An antiferromagnetically coupled (AFC) structure 606 consisting primarily of CoTaZr is grown on the adhesion layer 602. This amorphous AFC soft ferromagnetic layer, known as the Soft UnderLayer (SUL), provides the flux closure path emanating from the perpendicular recording head flying above the topmost layer of the multilayer structure. (See FIGS. 4-5.) A NiFe thin layer 612 is employed to seed the correct growth orientation of an hcp-Ru metal bilayer structure 608 in order to align the c-axis of the Co-based alloy 610 out-of-the plane of the thin film.

Figure 7:
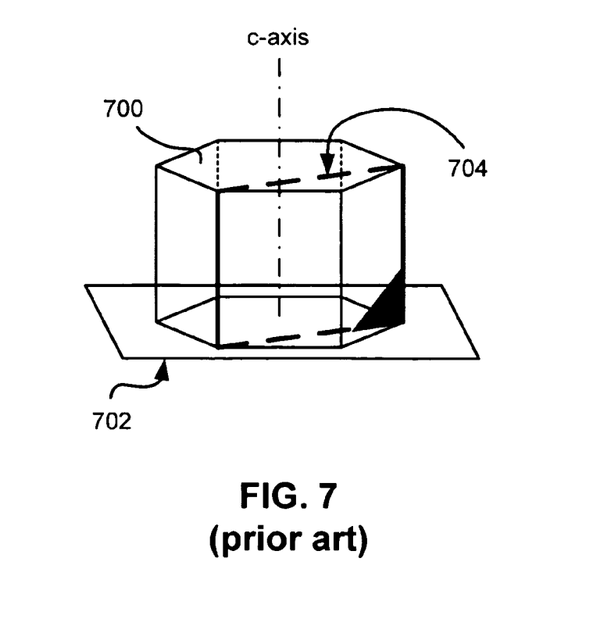
FIG. 7 is a schematic representation of a crystallographic orientation for out-of-plane c-axis control in the recording medium of FIG. 6.

Referring to FIG. 7, for perpendicular orientation of the magnetic axis, both the Ru and the Co-alloy (CoPtCr-Oxide) must grow with their basal planes [0001] 700 parallel to the thin film plane 702 and therefore their [11-20] crystal plane 704 is perpendicular to the thin film plane. Ru grows preferentially with such an orientation on NiFe. The texture tends to be poor and improvements in growth orientation of the Ru layer are attained by growing it under sputter conditions of low pressure and slow growth rates. Rocking Curve measurements support this experimental observation. However, low pressure and slow growth rates promote lateral grain growth which is undesirable for developing a recording layer microstructure comprising small, segregated magnetic grains with high coercivity. To reduce the recording layer grain size and achieve high coercivity and thus, high magnetic recording performance, the growth of the Ru underlayer is performed in two stages: first a ~5 nm thick layer is grown employing a sputter pressure of ~6 mTorr and a growth rate of ~1 nm/s; next a 12 nm layer of Ru is deposited employing a sputter pressure of 55 mTorr and a growth rate of ~2.5 nm/s.

The grain size reduction and the interface roughness achieved by the high pressure deposition of the Ru layer is critical and thus, acceptable recording characteristics can be derived even in the absence of the low pressure Ru sublayer in spite of the concomitant loss in growth orientation. The high pressure Ru layer is >10 nm to achieve the coercivity and nucleation field values for high recording performance. Increasing the thickness of the Ru layer too much is also undesirable, as it increases the physical distance between the SUL and the recording head. In addition when the Ru layer is too thick, it leads to the growth of crystallites with unfavorable growth orientations for rendering the magnetic axis out of plane. As will become apparent by reading the present disclosure, the thickness of the high pressure Ru in current-art perpendicular media is large enough to promote such undesirable Co-alloy growth orientation and thus there is a need to improve the degree of crystallographic texturing for both the Ru and Co-alloy layers.

SUMMARY OF THE INVENTION

The present disclosure describes a novel underlayer structure particularly suitable for a perpendicular recording medium. The underlayer structure significantly improves the microstructural properties of a recording layer formed thereon, thereby resulting in improvements in the recording properties of media, especially perpendicular media. The inventors have discovered that intercalating a judiciously chosen ~nanometer(s)-thick spacer layer between the lower and upper hcp metal layers dramatically improves the high pressure hcp metal underlayer crystallographic properties. The improvements in microstructure of the upper hcp metal layer carry over to the overlying recording magnetic layer, which in turn results in gains in recording media performance. Further, the thickness of the upper hcp metal layer can be reduced, thereby reducing the distance between the recording layer and the soft underlayer, providing further gains in recording media performance.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 8:
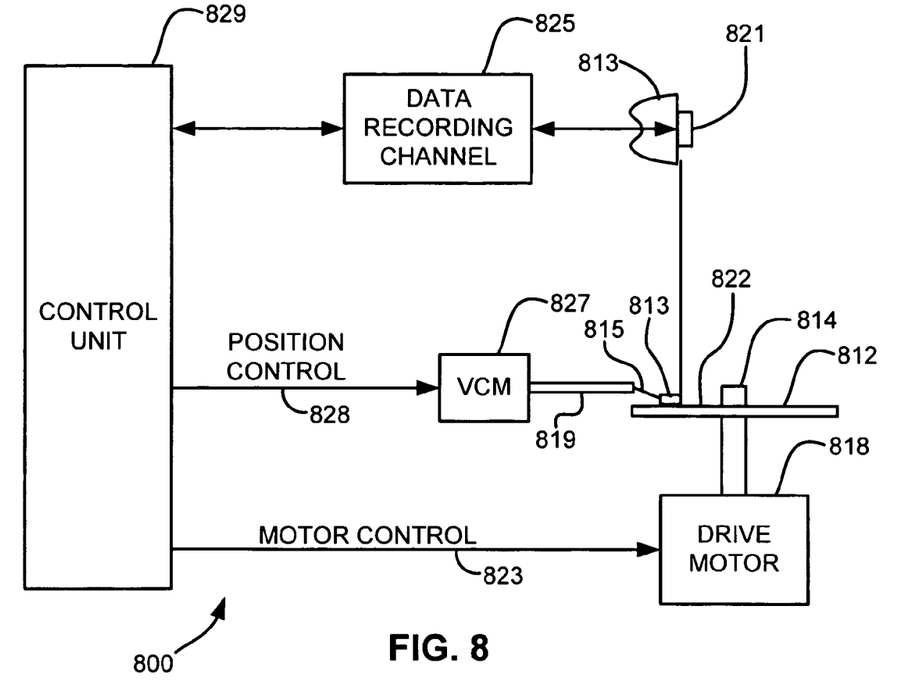
FIG. 8 is a simplified drawing of a magnetic recording disk drive system.

Referring now to FIG. 8, there is shown a disk drive 800 embodying the present invention. As shown in FIG. 8, at least one rotatable magnetic disk 812 is supported on a spindle 814 and rotated by a disk drive motor 818. The magnetic recording on each disk is in the form of an annular pattern of concentric data tracks (not shown) on the disk 812.

At least one slider 813 is positioned near the disk 812, each slider 813 supporting one or more magnetic read/write heads 821. More information regarding such heads 821 will be set forth hereinafter during reference to the remaining FIGS. As the disks rotate, slider 813 is moved radially in and out over disk surface 822 so that heads 821 may access different tracks of the disk where desired data are recorded. Each slider 813 is attached to an actuator arm 819 by way of a suspension 815. The suspension 815 provides a slight spring force which biases slider 813 against the disk surface 822. Each actuator arm 819 is attached to an actuator means 827. The actuator means 827 as shown in FIG. 8 may be a voice coil motor (VCM). The VCM comprises a coil movable within a fixed magnetic field, the direction and speed of the coil movements being controlled by the motor current signals supplied by controller 829.

During operation of the disk storage system, the rotation of disk 812 generates an air bearing between slider 813 and disk surface 822 which exerts an upward force or lift on the slider. The air bearing thus counter-balances the slight spring force of suspension 815 and supports slider 813 off and slightly above the disk surface by a small, substantially constant spacing during normal operation.

The various components of the disk storage system are controlled in operation by control signals generated by control unit 829, such as access control signals and internal clock signals. Typically, control unit 829 comprises logic control circuits, storage means and a microprocessor. The control unit 829 generates control signals to control various system operations such as drive motor control signals on line 823 and head position and seek control signals on line 828. The control signals on line 828 provide the desired current profiles to optimally move and position slider 813 to the desired data track on disk 812. Read and write signals are communicated to and from read/write heads 821 by way of recording channel 825.

The above description of a typical magnetic disk storage system, and the accompanying illustration of FIG. 8 are for representation purposes only. It should be apparent that disk storage systems may contain a large number of disks and actuators, and each actuator may support a number of sliders.

Intercalating judiciously chosen nanometer(s) thick metal oxide layers between low pressure and high pressure Ru layers dramatically improves the Ru underlayer crystallographic properties. This in turn results in improvements in microstructure of the Ru and the recording magnetic layer resulting in gains in recording media performance.

Figure 9:
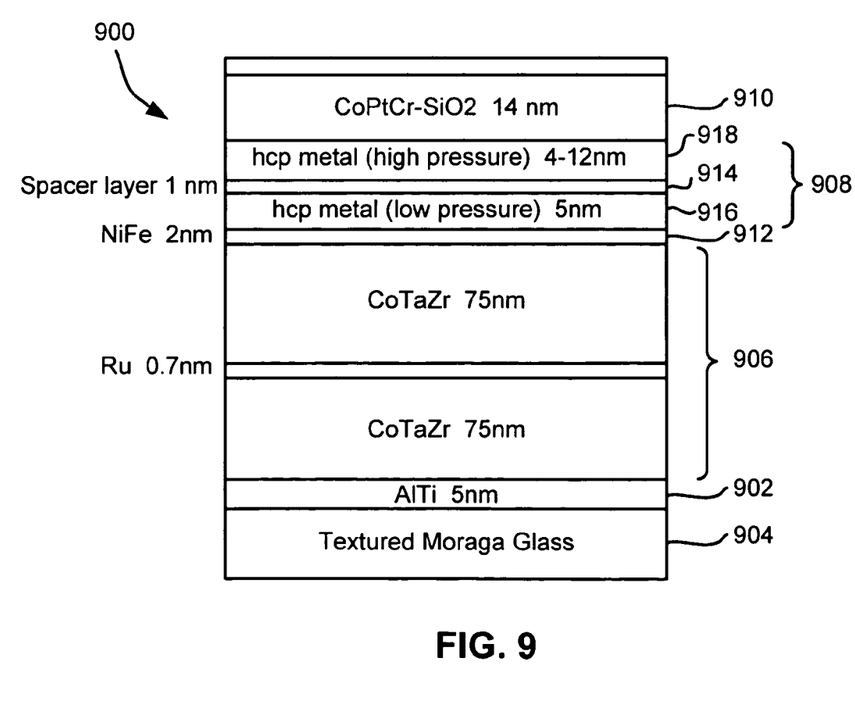
FIG. 9 is a simplified partial cross sectional view of a perpendicular recording medium according to one embodiment.

FIG. 9 illustrates a preferred embodiment of a recording medium 900. An adhesion layer 902, e.g., of an alloy of AlTi, is deposited on a glass substrate 904. An antiferromagnetically coupled (AFC) structure 906, e.g., of two layer of CoTaZr separated by a thin Ru layer, is grown on the adhesion layer 902. This amorphous AFC soft ferromagnetic layer, known as the Soft UnderLayer (SUL), provides the flux closure path emanating from the perpendicular recording head flying above the topmost layer of the multilayer structure.

A multilayer structure 908 is formed above the AFC structure. The multilayer structure 908 preferably includes two layers of hcp metals. Preferred hcp metals are Ru, Zn, Ti, and their alloys. Of the metal alloys, preferred alloys are of the hcp metal and X, where X=Cr, Mn, V and/or Cu.

One practicing the invention may find it desirable to form both layers 916, 918 of the same hcp metal, each of a different hcp metal, one of an hcp metal and the other of an hcp metal alloy, both of hcp metal alloys, etc.

The multilayer structure 908 controls the c-axis orientation of the Co-based magnetic recording layer 910. The Ru growth and its structural characteristics are important for achieving the desired magnetic and microstructural properties of the recording medium 900. To this effect, the multilayer structure 908 is grown on a seed layer 912 such as $NiFe_{20}$ and the hcp metal growth parameters (the sputter pressure, growth rate, etc) are optimized for each layer to improve its crystallographic properties and to improve lattice matching to the Co-alloy recording layer 910. The lower hcp metal layer 916 is preferably formed at lower sputtering pressure and at a slower growth rate than the upper hcp metal layer 918.

As shown, a spacer layer 914 is deposited on top of the low pressure hcp metal sublayer 916. The thickness and the sputter pressure of the spacer layer 914 are optimized to achieve the desired media coercivity and to constrain the overall thickness of this laminated underlayer structure. The spacer layer 914 can be formed of a metal oxide, such as $Ta_2O_5$, $SiO_2$ and MgO. The spacer may be formed of body cubic centered (bcc) metals and their alloys. Elemental metals, such as Cr and bcc metals (e.g., Mo, V, and W), can also be employed in or as the spacer layer to improve microstructural properties. Also desirable are alloys of the bcc metals, especially CrX alloys, where X=Mo, V, Ti and/or W. Other suitable alloys include CrXY and CoXY, where X=Mo, V, Ti and/or W and Y=B.

Further, amorphous metal alloys such as NiP and TiN can be implemented in the spacer layer 914. Additional illustrative amorphous metals include NiP, $Co_xFe_yB_z$ (x=0.3 to 0.7, y=0.3 to 0.7 and z=0.1 to 0.4), $W_{50}Re_{50}$. Suitable alloys are CrXY and CoXY, where X=Mo, V, Ti and/or W and Y=an oxide such as $Ta_2O_5$, $SiO_2$ and/or $TiO_2$. Amorphous metals in the spacer layer appear to provide a greater benefit than elemental metal, as the material formed on the amorphous metal underlayer is free to grow in its preferred crystalline shape.

Without wishing to be bound by any theory, it is believed that the spacer layer 914 minimizes the loss of energy of the arriving overlying material, thereby maximizing its adatom mobility. The improved adatom mobility allows the arriving atoms to align in a more uniform (and preferential) manner. This improved formation in turn improves the structure of the overlying recording layer 910.

In an illustrative process for forming the multilayer structure 908, first about a 5±3 nm thick layer 916 is grown employing a sputter pressure of about 1 to 8 mTorr and a growth rate of about 0.1 to 2 nm/s. Then the spacer layer 914 is formed on the first hcp metal layer 916 by sputtering at a sputtering pressure of about 1 to 50 mTorr and a growth rate of 0.1 to 10 nm/s. The thickness of the spacer layer 914 is preferably in the range of between about 0.2 and 4 nm (depending on the nature of the spacer). The growth rate for the spacer layer is in the range of 0.1 to 4 nm/s and the sputter pressure ranges from 3 to 60 mTorr. Next, about a 2 to 15 nm layer 918 of hcp metal is deposited on the spacer layer 914 employing a sputter pressure of about 30 to 100 mTorr and a growth rate of about 2 to 10 nm/s. Again, these values and ranges are provided by way of example only. One skilled in the art will appreciate that the actual value selected can vary from those presented here depending on the materials selected, the particular structure being created, the desired properties of the structure being created, and additional processing parameters.

EXAMPLES

In one experimental embodiment, a 1 nm layer of $Ta_2O_5$ was intercalated above a 5 nm bottom Ru layer deposited employing a sputter pressure of 6 mTorr and a growth rate of 1 nm/s. The thickness of the top Ru layer, which was sputtered at high pressure and grown at 2.5 nm/s, was varied from 4.8 to 12 nm. Therefore the structural and recording characteristics of three perpendicular media total with underlayer thicknesses of 17 nm (no spacer), 9.8 nm (no spacer) and 10.8 nm (includes the spacer) were compared.

To study the impact of the laminated underlayer structure on crystallographic properties of perpendicular recording media, the inventors employed x-ray diffraction (XRD) both in the normal and in the grazing incidence mode. The latter allows probing of structural properties perpendicular to the film growth direction. This geometry permits measurements of lateral grain size, microstrain, in-plane lattice parameters and can reveal undesirable crystal growth for perpendicular recording.

Figure 10:
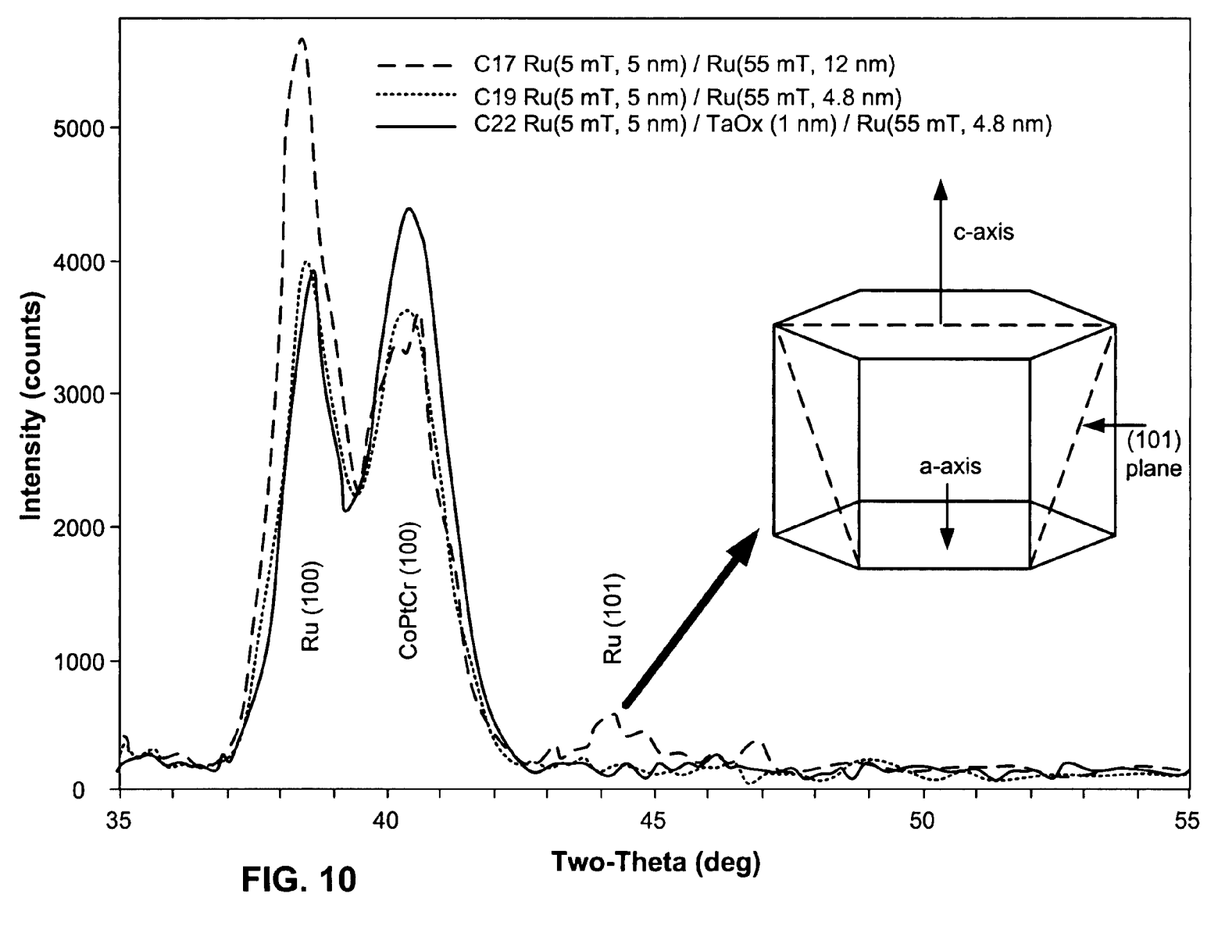
FIG. 10 is an in-plane XRD spectra for current-art perpendicular media having different top Ru layer thicknesses, and for a structure with a thin Ru top layer grown on a Ta-oxide spacer layer.

FIG. 10 compares the out-of-plane spectra of three perpendicular recording media structures: C17, C19, C22. The recording layer thickness and growth conditions as well as other ancillary layers shown in FIG. 9 were kept identical. C17 employs current-art thicknesses for the low and high pressure Ru layers. For C19 on the other hand, the thickness of the high pressure Ru layer has been reduced to 4.8 nm. Finally, C22 incorporates a 1 nm Ta-oxide layer between the two Ru layers. Notice that C22 has an enhanced (10-10) texture perpendicular to the film plane compared with current art C17.

The spectra shown in FIG. 10 indicates that a fraction of the Ru crystallites for the case of the current-art underlayer structure (C17) develop a fraction of undesirable grains oriented with their (10-11) (same as [101]) planes perpendicular to the thin film plane. The Ru (101) plane is identified in the insert which depicts a Ru unit cell with its c-axis oriented out of the plane of the film. Magnetic grains epitaxially growing on this Ru (110) plane will develop a magnetic axis orientation not perpendicularly oriented. The spectra show that the structures with the thinner top Ru layers do not develop this undesired Ru (101) orientation. However, the reduced top Ru layer in C19 results in coercivity and nucleation field reduction which decreases media performance. The spectrum reveals also that the CoPtCr—$SiO_2$ layer in C22 is better textured than the other two structures as evidenced by the stronger intensity of the CoPtCr (100) peak. Additional information on the structural improvements afforded by the invention are derived from analysis of FIG. 11 which shows spectra acquired in the grazing incidence mode.

Figure 11:
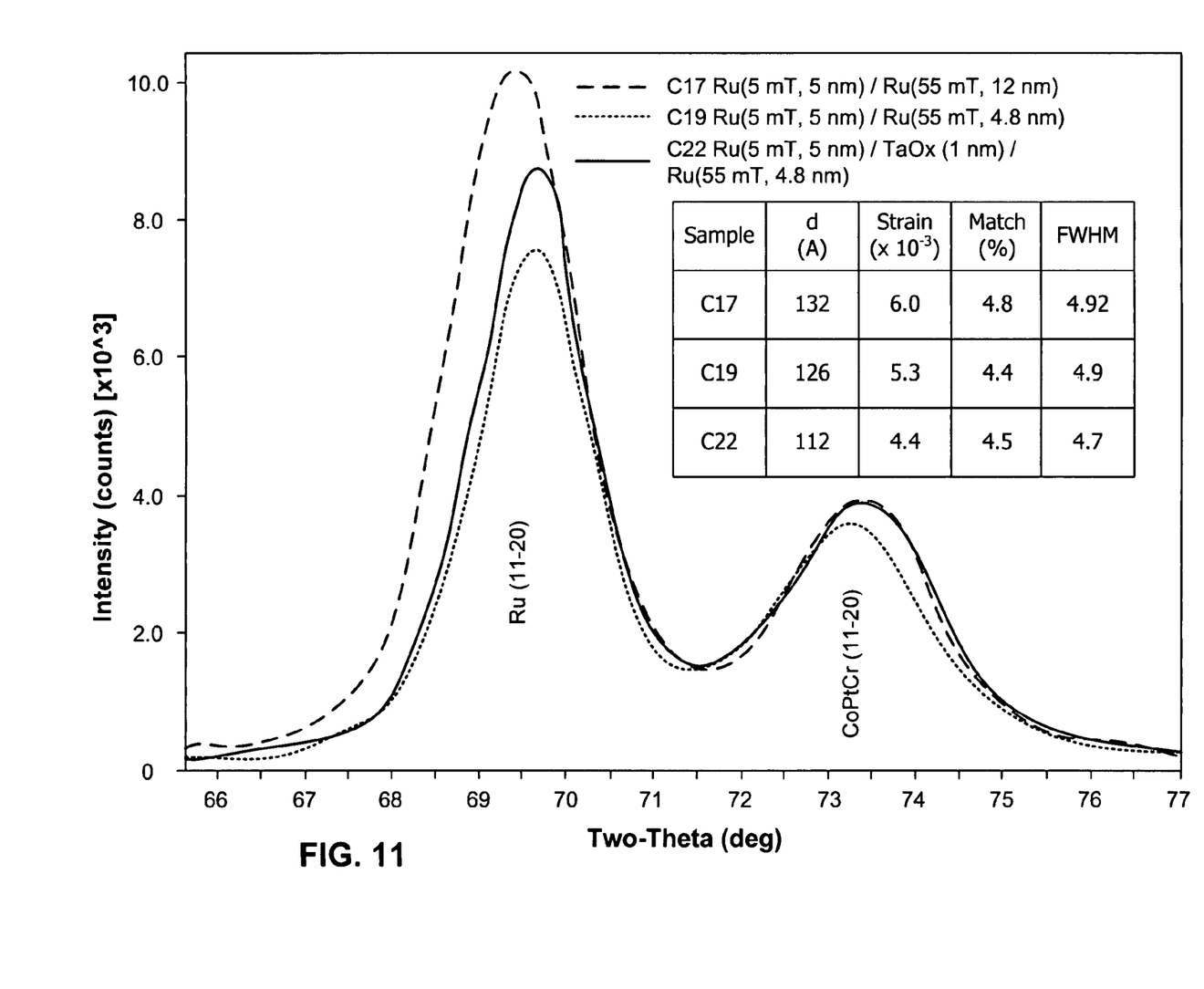
FIG. 11 is a chart of a comparison of structural properties for Ru and Co grown on conventional underlayers, and when grown with the intercalated Ta-oxide layer of the invention.

The insert in the FIG. 11 tabulates values for lateral grain size, microstrain, lattice mismatch for Ru derived from these in-plane scans. In addition the table gives value for texture (FWHM) derived from rocking curve measurements. The results clearly indicate that the presence of the oxide interlayer reduces the grain size, decreases the microstrain (crystalline defects), reduces the lattice mismatch between the Ru and the Co-alloy and leads to superior texturing (narrowest FWHM). The benefits may be derived from changes in the kinetics of grain growth brought about by an interlayer that provides larger adatom surface mobility and a break in the coherent growth between the two Ru layers.

Figure 12:
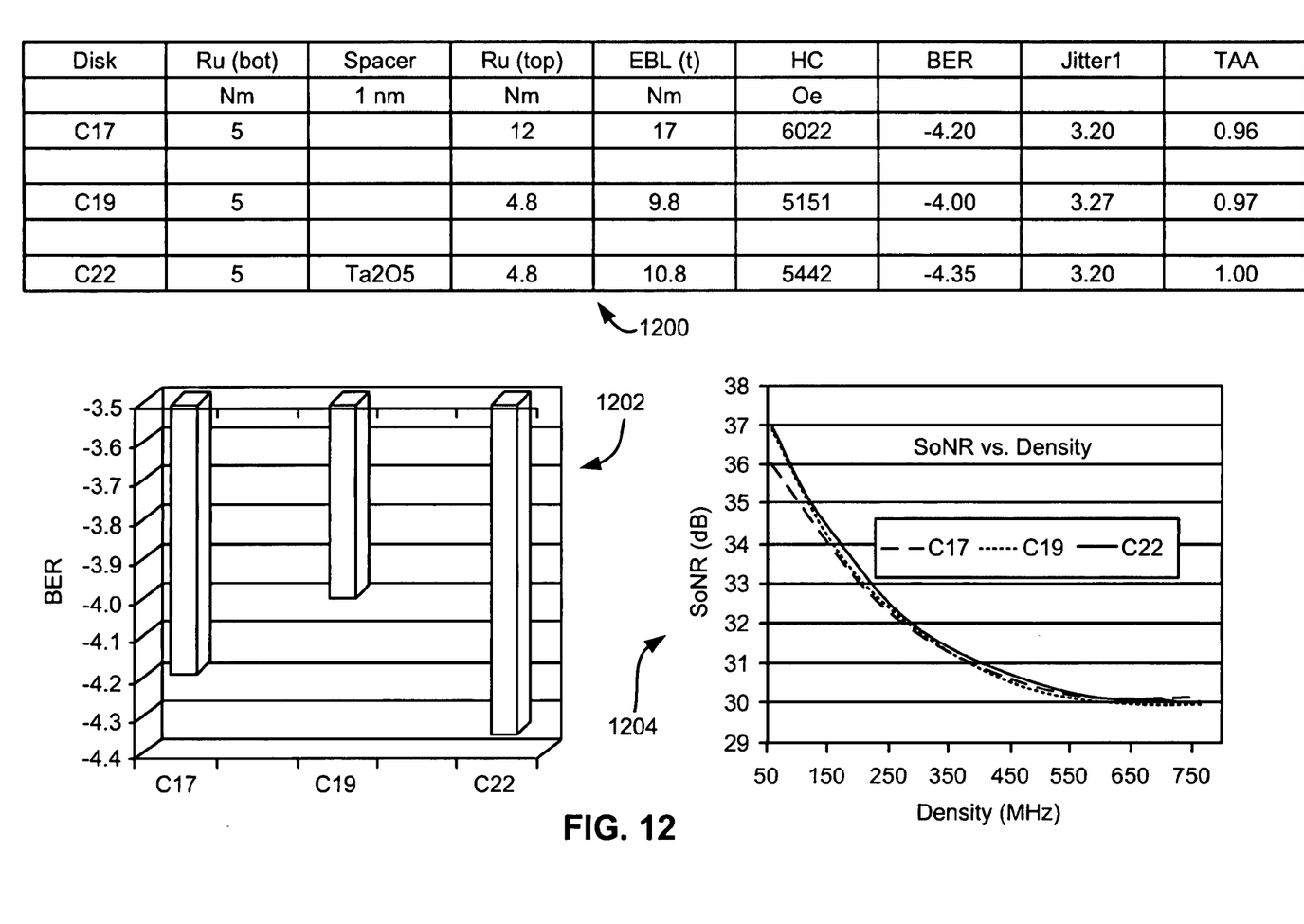
FIG. 12 is a graphical recording media performance comparison between current-art media structures, and structures incorporating the teachings of the present disclosure.

Recording experiments conducted on these three structures corroborate that said microstructural improvements translate into performance gains as summarized in FIG. 12.

The table 1200 in FIG. 12 summarizes media structures, key recording parameter results and media coercivity for the three samples whose microstructural properties are reported above. As mentioned earlier, decreasing the thickness of the high-pressure top Ru layer leads to coercivity reduction and an increase in the BER, as shown in chart 1202. Intercalating the oxide layer (C22) between the Ru, increases the coercivity and results in a BER value lower than the current-art structure (C17). The coercivity of C-22-like structures was increased by growing the lower Ru layer at sputter pressures>6 mTorr. For example, growth of the lower Ru layer in C22 at 13 mTorr resulted in an Hc value of 5700 Oe and a BER value of −4.5. No negative impact on crystallographic properties was observed. The low densities SoNR is improved by this embodiment of the invention with no penalty observed at high densities, as illustrated in chart 1204. In contrast for the case of C19 (thin top Ru layer) one observes a gain at low densities in SoNR, which is offset by a loss at high recording densities.

The benefits of the invention are not derived by intercalating any randomly chosen oxide spacer within the Ru underlayers. The following oxides were evaluated and listed in decreasing improvement order: $Ta_2O_5$, $SiO_2$ and MgO. In contrast, $TiO_2$, completely destroyed the desired crystallographic properties of the Ru underlayers. Strong covalent bonding of the metal oxide is required and the oxide surface must promote Ru adatom mobility to improve texture.

Figure 13:
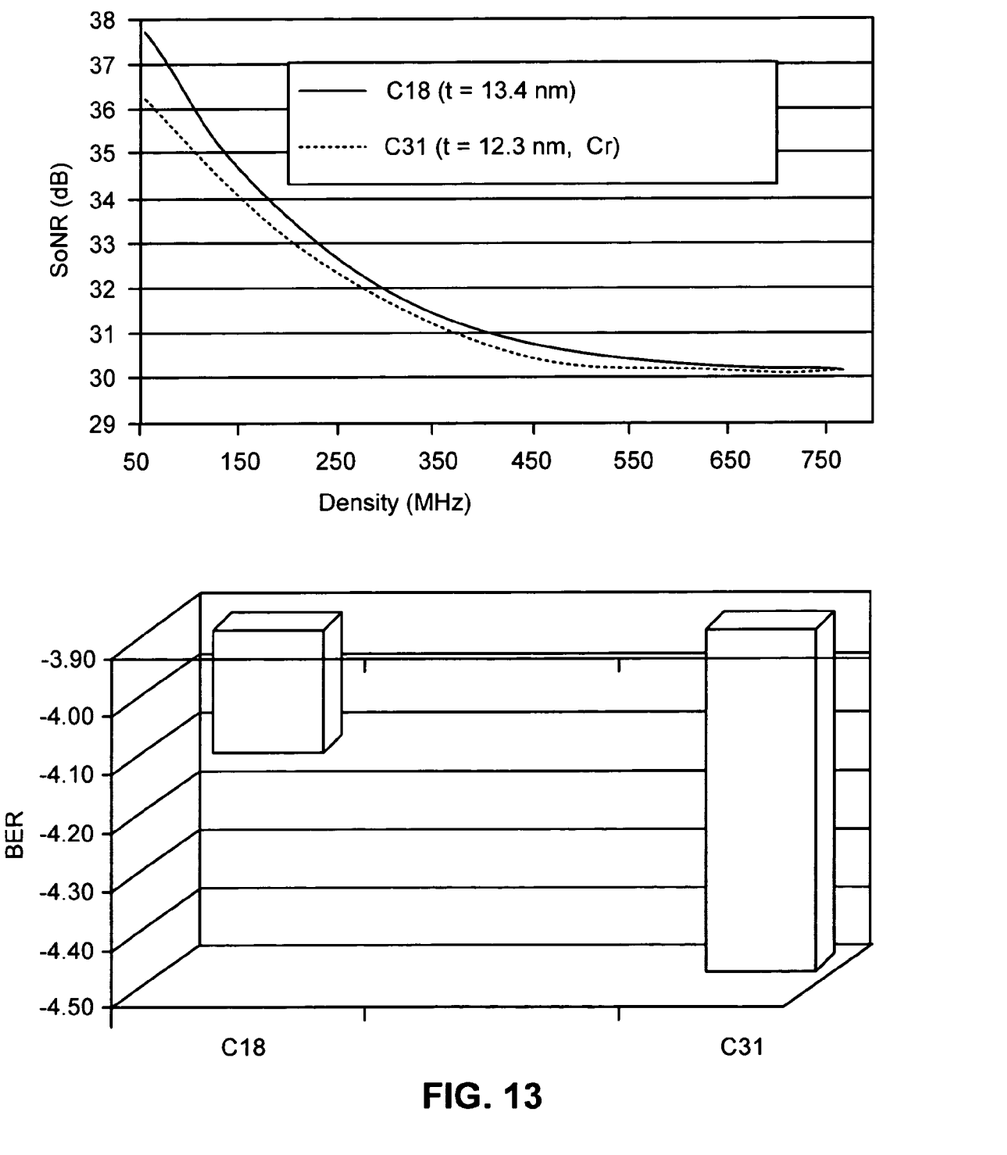
FIG. 13 is a graphical recording media performance comparison between conventional media structures and one containing a 2.5 nm Cr spacer between Ru layers.

FIG. 13 compares the recording performance of a perpendicular recording medium employing a bottom 5 nm Ru layer and a top 8.4 nm (C18) with another structure whose bottom layer is of identical thickness. A 2.5 nm Cr spacer has been intercalated between the bottom and the thinner (4.8 nm) Ru layer. A significant improvement in BER and SoNR are observed for the structure containing the Cr spacer layer. Once again it is noted that most metallic spacers are highly disruptive and hence, introductions of Pd, Pt, Cu and Nb destroyed the growth characteristics of the top Ru layer when said metals were used as spacer and grown at low sputter pressures.

While various embodiments have been described above, it should be understood that they have been presented by way of example only, and not limitation. For instance, perpendicular media includes the media described in FIG. 4 as well as perpendicularly oriented patterned media. Thus, the breadth and scope of a preferred embodiment should not be limited by any of the above-described exemplary embodiments, but should be defined only in accordance with the following claims and their equivalents.

What is claimed is:

1. A recording medium, comprising:
a soft underlayer;
a seed layer formed above the soft underlayer;
a first layer of hexagonal closed packed (hcp) metal formed on the seed layer;
a second layer of hcp metal formed above the first layer of hcp metal;
a magnetic layer formed above the second layer of hcp metal; and
a spacer layer intercalated between the first and second layers of hcp metal, the spacer layer being formed directly on the first layer of hcp metal, the second layer of hcp metal being formed directly on the spacer layer,
wherein at least one of the first and second layers of hcp metal is constructed of RuX, where X is selected from a group consisting of Cr, Mn, V and Cu,
wherein the spacer layer is constructed of a metal oxide.

2. A recording medium as recited in claim 1, wherein the spacer layer has a different chemical composition than the first and second layers of hcp metal.

3. A recording medium as recited in claim 1, wherein the spacer layer has a thickness sufficient to inhibit coherent grain growth between the first and second layers of hcp metal.

4. A recording medium as recited in claim 1, wherein a chemical nature of the spacer layer is such that an adatom mobility of the second layer of hcp metal formed thereon is increased.

5. A recording medium, comprising:
a first layer of hexagonal closed packed (hcp) metal;
a second layer of hcp metal formed above the first layer of hcp metal;
a magnetic layer formed above the second layer of hcp metal; and
a spacer layer intercalated between the first and second layers of hcp metal, the spacer layer being formed directly on the first layer of hcp metal, the second layer of hcp metal being formed directly on the spacer layer,
wherein the spacer layer is constructed of a metal oxide.

6. A recording medium as recited in claim 1, wherein a thickness of the spacer layer is between about 0.2 and about 4 nanometers (nm).

7. A recording medium as recited in claim 1, wherein the spacer layer is constructed of an amorphous metal, a bcc metal, or their alloys.

8. A recording medium as recited in claim 7, wherein a thickness of the spacer layer is between about 0.2 and about 4 nanometers (nm).

9. A recording medium as recited in claim 7, wherein the spacer layer is constructed of Cr.

10. A recording medium as recited in claim 1, wherein at least one of the first and second layers of hcp metal is constructed of RU.

11. A recording medium, comprising:
a soft underlayer;
a seed layer formed above the soft underlayer;
a first layer of hexagonal closed packed (hcp) metal formed on the seed layer;
a second layer of hcp metal formed above the first layer of hcp metal;
a magnetic layer formed above the second layer of hcp metal; and
a spacer layer intercalated between the first and second layers of hcp metal, the spacer layer being formed on the first layer of hcp metal, the second layer of hcp metal being formed on the spacer layer, wherein at least one of the first and second layers of hcp metal is constructed of RuX, where X is selected from a group consisting of Cr, Mn, V and Cu, wherein the spacer layer is constructed of an amorphous metal alloy.

12. A recording medium as recited in claim 1, wherein the hcp metal in the first layer is different than the hcp metal in the second layer.

13. A recording medium as recited in claim 12, wherein the hcp metal is a different alloy in each of the first and second layers.

14. A recording medium as recited in claim 1, wherein the hcp metal in the first layer is a substantially pure metal, wherein the hcp metal in the second layer is RuX.

15. A recording medium as recited in claim 1, wherein the first layer of hcp metal is formed under low pressure, wherein the second layer of hcp metal is formed tinder high pressure.

16. A recording medium, comprising:
a soft underlayer structure;
a seed layer above the soft underlayer structure;
a first layer of hexagonal closed packed (hcp) metal formed on the seed layer;
a second layer of hcp metal formed above the first layer of hcp metal;
a magnetic layer formed above the second layer of hcp metal;
a spacer layer intercalated between the first and second layers of hcp metal,
wherein all portions of the soft underlayer structure are positioned tinder the first and second layers of hcp metals,
wherein at least one of the first and second layers of hcp metal is constructed of RuX, where X is selected from a group consisting of Cr, Mn, V and Cu,
wherein the spacer layer is constructed of an amorphous metal alloy.

17. A recording medium as recited in claim 16, wherein a chemical nature of the spacer layer is such that an adatom mobility of the second layer of hcp metal formed thereon is increased.

18. A magnetic storage system, comprising:
magnetic media having a structure as recited in claim 1;
at least one head for reading from and writing to the magnetic media, each head having:
a sensor; and
a write element coupled to the sensor;
a slider for supporting the head; and
a control unit coupled to the head for controlling operation of the head.

19. A recording medium as recited in claim 16, wherein the spacer layer has a thickness sufficient to inhibit coherent grain growth between the first and second layers of hcp metal.

20. A recording medium, comprising:
a first layer of hexagonal closed packed (hcp) metal;
a second layer of hcp metal formed above the first layer of hcp metal;
a magnetic layer formed above the second layer of hcp metal; and
a spacer layer intercalated between the first and second layers of hcp metal,
wherein the spacer layer has a different chemical composition than the first and second layers of hcp metal,
wherein the spacer layer has a thickness sufficient to inhibit coherent grain growth between the first and second layers of hcp metal,
wherein a chemical nature of the spacer layer is such that an adatom mobility of the second layer of hcp metal formed thereon is increased,
wherein the spacer layer is constructed of a metal oxide selected from a group consisting of $Ta_2O_5$, $SiO_2$ and MgO.

21. A recording medium as recited in claim 16, wherein the spacer layer is constructed of an amorphous metal, a bcc metal, or their alloys, wherein a chemical nature of the spacer layer is such that an adatom mobility of the second layer of hcp metal formed thereon is increased.

22. A recording medium as recited in claim 16, wherein at least one of the first and second layers of hcp metal is constructed of Ru.

23. A recording medium as recited in claim 16, wherein the hcp metal in the first layer is different than the hcp metal in the second layer.

24. A recording medium as recited in claim 16, wherein the hcp metal in the first layer is a substantially pure metal, wherein the hcp metal in the second layer is RuX.

25. A magnetic storage system, comprising:
magnetic media having a structure as recited in claim 16;
at least one head for reading from and writing to the magnetic media, each head having:
a sensor; and
a write element coupled to the sensor;
a slider for supporting the head; and
a control unit coupled to the head for controlling operation of the head.

26. A recording medium as recited in claim 6, wherein the metal oxide is selected from a group consisting of $Ta_2O_5$, $SiO_2$ and MgO.

* * * * *

UNITED STATES PATENT AND TRADEMARK OFFICE
CERTIFICATE OF CORRECTION

PATENT NO. : 7,722,967 B2 Page 1 of 1
APPLICATION NO. : 11/192387
DATED : May 25, 2010
INVENTOR(S) : Marinero et al.

It is certified that error appears in the above-identified patent and that said Letters Patent is hereby corrected as shown below:

col. 6, line 59 replace "(110)," with --(101)--.

col. 9, line 30 claim 16 replace "tinder", with --under--.

Signed and Sealed this

Third Day of August, 2010

David J. Kappos
*Director of the United States Patent and Trademark Office*